(12) United States Patent
Blair

(10) Patent No.: US 8,132,089 B1
(45) Date of Patent: Mar. 6, 2012

(54) ERROR CHECKING AT THE RE-SEQUENCING STAGE

(75) Inventor: Christopher Douglas Blair, South Chailey (GB)

(73) Assignee: Verint Americas, Inc., Roswell, GA (US)

( * ) Notice: Subject to any disclaimer, the term of this patent is extended or adjusted under 35 U.S.C. 154(b) by 903 days.

(21) Appl. No.: 12/173,146

(22) Filed: Jul. 15, 2008

Related U.S. Application Data

(60) Provisional application No. 61/049,913, filed on May 2, 2008.

(51) Int. Cl.
*G06F 11/00* (2006.01)
(52) U.S. Cl. ........................ 714/811; 714/815
(58) Field of Classification Search .................. 714/811, 714/815
See application file for complete search history.

(56) References Cited

U.S. PATENT DOCUMENTS

| | | | | |
|---|---|---|---|---|
| 6,393,487 B2* | 5/2002 | Boucher et al. | | 709/238 |
| 6,487,200 B1 | 11/2002 | Fraser | | |
| 6,781,992 B1* | 8/2004 | Rana et al. | | 370/394 |
| 6,847,632 B1* | 1/2005 | Lee et al. | | 370/352 |
| 6,865,604 B2* | 3/2005 | Nisani et al. | | 709/224 |
| 7,349,398 B1* | 3/2008 | Favor et al. | | 370/394 |
| 7,480,308 B1* | 1/2009 | Cohen et al. | | 370/412 |
| 7,590,230 B1 | 9/2009 | Surazski | | |
| 7,899,038 B2* | 3/2011 | Ulybin | | 370/353 |

FOREIGN PATENT DOCUMENTS

| | | |
|---|---|---|
| EP | 0813326 | 12/1997 |
| EP | 1788489 | 5/2007 |

OTHER PUBLICATIONS

Quittek, J., "Requirements for IP Flow Information Export", IETF Standard Working Draft, Internet Engineering Task Force, IETF CH, Jun. 1, 2004, pp. 1-32, vol. ipfix, No. 16.

* cited by examiner

*Primary Examiner* — Stephen Baker
(74) *Attorney, Agent, or Firm* — McKeon, Meunier, Carlin & Curfman

(57) ABSTRACT

Computer communications that are to be recorded are visible to a network interface on a recording computer. The network interface receives the packets to be recorded. The network layer of the recording computer implements a subset of the normal IP module in the network layer. The IP module in the network layer assumes that most IP datagrams are correctly addressed, internally consistent and of the expected protocol type. The recording computer allocates the received datagrams to a recording session based upon at least a first value of a field that is at a fixed position within the datagram. The datagrams for a session are ordered into an ordered recording stream based upon a timestamp within the datagram. The datagrams are also checked for criteria that indicate an error condition. The allocated and ordered datagrams are recorded or associated with other datagrams that have been allocated to the same session.

24 Claims, 5 Drawing Sheets

ERROR CHECKING AT THE RE-SEQUENCING STAGE

RELATED APPLICATIONS

This application hereby claims the benefit of and priority to U.S. Provisional Patent Application No. 61/049,913, titled "SYSTEM AND METHOD FOR PERFORMANCE BASED CALL DISTRIBUTION", filed on May 2, 2008, and which is hereby incorporated by reference in its entirety. This application is related to U.S. patent application Ser. No. 12/015,621, entitled "DEDICATED NETWORK INTERFACE", filed on Jan. 17, 2008, and which is hereby incorporated by reference in its entirety.

TECHNICAL FIELD

The invention is related to the field of recording communications.

TECHNICAL BACKGROUND

Computer communications carried over computer networks may be recorded. Typically, a computer is used to collect and record the communications. The collection of computer communications is done in three main ways. "Promiscuous mode tapping" collects all packets on the network and then the recording computer filters these to determine which to keep. In a "conference bridge approach," the recording computer becomes a participant in the call and receives packets from the other participants and/or from a conference bridge. Lastly, a party (e.g. computer) in the communication may forward packets or derivatives of packets that form the communication session to the recording computer.

The recording computer typically taps the network or receives the communication to be recorded over an industry standard Network Interface Card (NIC) which supports a protocol stack. This would typically include the TCP/IP stack.

However, the recording application can be very demanding of the performance capabilities of the recording computer. For example, when recording communications using promiscuous mode tapping on some of the most advanced networks, the recording computer may receive data at a rate of 10 gigabits per second. That may translate to as many as 1.25 gigabytes per second that need to be processed, filtered, and ultimately recorded by the recording computer. This amount of processing may overload some recording computers, thereby resulting in the loss of some of the communications that should have been recorded. Accordingly, to prevent data loss and allow the use of less expensive computers as recording computers, there is a need in the art for more efficient recording systems.

TECHNICAL SUMMARY

A method of recording computer communications is disclosed. Computer communications that are to be recorded are visible to a network interface on a recording computer. The network interface receives the packets to be recorded. The network layer of the recording computer implements a subset of the normal IP module in the network layer. Instead of checking every IP datagram, the IP module in the network layer assumes that most IP datagrams are correctly addressed, internally consistent and of the expected protocol type. The recording computer allocates the received datagrams to a recording session based upon at least a first value of a field that is at a fixed position within the datagram. The datagrams for a session are ordered into an ordered recording stream based upon a timestamp within the datagram. The datagrams are also checked for criteria that indicate an error condition. The allocated and ordered datagrams are recorded or associated with other datagrams that have been allocated to the same session.

A system for recording computer communications is disclosed. A network interface on a recording computer receives packets to be recorded. A datagram allocator allocates the received datagrams to a recording stream based upon at least a first session identifier specified at a fixed offset within each datagram. A re-sequencer orders the datagrams based upon a timestamp within the datagram into an ordered stream of datagrams and checks the datagrams for criteria that indicate an error condition.

A criterion that indicates an error condition may be detecting more than a threshold number of datagrams having timestamps with in a set time period.

A criterion that indicates an error condition may be detecting a datagram that was received out of order by more than a threshold number of datagrams.

A criterion that indicates an error condition may be detecting more than a threshold number of duplicate datagrams out of a set number of datagrams.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
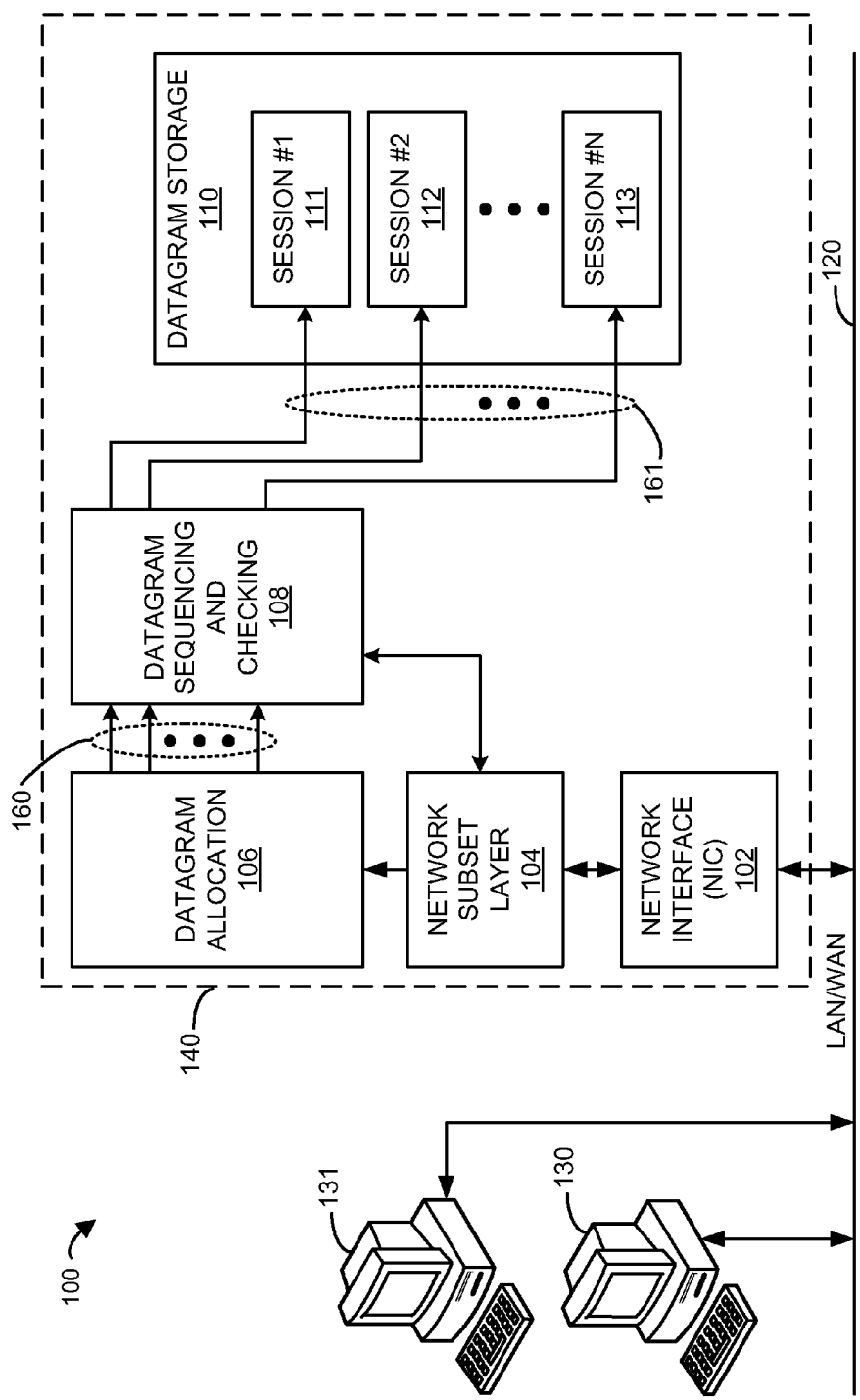
FIG. 1 is a block diagram illustrating a system for recording computer communication sessions.

FIG. 1 is a block diagram illustrating a system for recording computer communication sessions. Communication recording system 100 includes computers 130 and 131 operatively coupled to network 120. Recording computer 140 is also operatively coupled to network 120. Network 120 may be a Local Area Network (LAN) or a Wide Area Network (WAN) or some other form of computer communications network. Recording computer 140 includes network interface 102. Network interface 102 is operatively coupled to network 120. Network interface 102 is also operatively coupled to network subset layer 104. Network subset layer 104 is operatively coupled to datagram allocation 106 and datagram sequencing and checking 108.

Datagram allocation 106 is operatively coupled to datagram sequencing and checking 108 via recording streams 160. Datagram sequencing and checking 108 is operatively coupled to network subset layer 104 so that it may trigger additional datagram tests within the network subset layer 104.

Datagram sequencing and checking 108 is operatively coupled to datagram storage 110 via ordered recording streams 161. Datagram storage includes session #1 111, session #2 112 and session #N 113. Datagram sequencing and checking 108 is operatively coupled to sessions 111-113 via ordered recording streams 161. Thus, datagram allocation 106 is operatively coupled to each of sessions 111-113 via recording streams 160, datagram sequencing and checking 108, and ordered recording streams 161. Sessions 111-113 may correspond to a group of datagrams that a recording application desires to group together or otherwise associate, such as a voice over Internet Protocol call (VoIP), or all the datagrams to or from a particular internet phone.

Computers 130 and 131 may direct communications to be recorded to recording computer 140 via network 120. Computers 130 and 131 may exchange information with recording computer 140 via a non-recording network interface (not shown) to establish that computers 130 and 131 are authorized to direct traffic to network interface 120.

Examples of communications that may be directed to recording computer 140 are VoIP telephone calls. For example, to record the contents of a VoIP call between computers 130 and 131, a VoIP application running on computer 131 may send packets to recording computer 140 as if it were also a participant in a conference call. Recording computer 140 could then record the VoIP datagrams (grouped, for example, as a session #1 111) so that the audio contents of the call may be reconstructed and replayed. In another example, computer 131 may store a local copy of the VoIP or digitized version of a Plain Old Telephone System (POTS) call. At a certain time, perhaps when network 120 and/or computer 131 is not busy, this local copy is then sent to recording computer 140 via network 120.

Other forms of directing communications to recording computer 140 are also possible. For example, using port mirroring, all of the packets that come from, go to, or pass through, a given network router, switch, or other device may be directed to recording computer 140 by that device. In an example, these mirrored packets may be encapsulated in order to specify the IP address of network interface 102 thus ensuring proper routing of the packet on its way to network interface 102.

In another example, the mirrored packets may be encapsulated and sent as the payload of an RTP packet stream. The destination IP address of these RTP packets may be set to that of the recorder's dedicated network interface 102, and the UDP port number field is set to a value representing a specific recorded session. Details of which UDP port number relates to which recording session, such as source and destination IP addresses and ports, may be exchanged separately between recording computer 140 and the device that encapsulates the packets. In this case, depending upon the method chosen, recording computer 140 may or may not need to un-encapsulate and/or forward those packets back to network 120 (or another network, not shown) so they may ultimately be routed to the appropriate destination.

In another example, a similar approach may be used with a TCP socket in place of an RTP packet stream. This would allow more reliable transmission of the stream. This increased reliability is particularly important in cases where the occasional loss of a packet is unacceptable. For example, when email is being recorded by recording computer 140, the occasional loss of a packet as may occur when using RTP is unacceptable.

The operative coupling of recording computer 140 and network 120 may be described by a reference model for communications and network protocol design. This description may be referred to as the TCP/IP or Internet reference model and includes five layers. These layers, which are all operatively coupled, may be referred to as the physical layer, the data link layer, the network/internet layer, the transport layer, and the application layer. The physical layer may be implemented by an Application Specific Integrated Circuit (ASIC) or other analog and digital electronics. The elements of the physical layer may reside in network interface 102. The data link layer may also be implemented on network interface 102 by firmware cooperating with hardware driver software in the operating system of recording computer 140. The network layer and transport layer may be implemented in the operating system software running on recording computer 140.

After network interface 102 receives a packet and processes the packet through the physical and data link layers into a form suitable for the network layer, it passes a datagram to the network subset layer 104. Network subset layer 104 processes and responds to the datagrams received from the data link layer to implement at least one of the network layer functions. For example, network subset layer 104 may check the destination address field of the header of a datagram in Internet Protocol (IP) form. Examples of IP datagram formats are given by IPv4 and IPv6.

In another example, the data link layer may determine that a packet is an Address Resolution Protocol (ARP) request. The network subset layer 104 may then respond appropriately. In another example, the data link layer may determine that the packet is an IP datagram. In this case, the network subset layer 104 may pass the datagram to the transport layer (e.g. datagram allocation 106) without further checks or processing. In addition, network subset layer 104 may also implement other functions or protocols necessary for recording computer 140 to perform the function of recording datagrams directed to it via network 120.

Datagram allocation 106 receives datagrams from network subset layer 104. Datagram allocation 106 may be part of a transport layer or may be implemented separately. In an embodiment, datagram allocation 106 may accomplish the function of allocating datagrams passed to it by the network layer by examining at least a first value at a fixed location, or offset, in each datagram and using this value as a basis to identify a session. Datagram allocation 106 may also examine other values at other fixed locations, or offsets, in each datagram and use these values as the basis to identify a session.

In an embodiment, if the datagram is formatted as a User Datagram Protocol (UDP) datagram, then the value at the fixed location may be, for example, the destination port number of the datagram. In an embodiment, datagram allocation 106 may allocate datagrams based upon the destination port number of the datagram. For example, datagram allocation 106 may allocate a datagram to session #1 111 when the destination port number of the datagram is 1. Datagram allocation 106 may also allocate a datagram to session #2 112 when the destination port number of the datagram is 2, and so on. This function may be used with arbitrary port number-session number pairings such as allocating datagrams with a destination port number of 73 to session #N 113 where "#N" is an arbitrary identifier of the session these datagrams are to be associated with such as 99, or "VoIP call between 970-555-1234 and 408-555-9876 from 11:05 to 13:07 on Oct. 9, 2007", or email "message-ID=14432593.1191958317010."

In another embodiment, datagram allocation 106 may allocate datagrams based upon a plurality of values at fixed locations in the datagram. For example, a combination of two fields and possibly four may be the basis for allocating a datagram. As an example, consider the case of a conference bridge sending from a single IP address and port to many participants in a conference. In this case, the IP source address, source port number, IP destination address, and destination port number, which are all at fixed offsets, may be used to allocate datagrams.

Once datagrams are allocated to a session, they are passed to datagram sequencing and checking 108 via recording streams 160. Each of recording streams 160 corresponds to a session 111-113.

Datagram sequencing and checking 108 re-sequences the datagrams in the recording streams 160. For each recording stream 160, datagram sequencing and checking 108 orders the datagrams in that stream according to a timestamp in each datagram. The datagrams in each of the recording streams 160 are ordered relative to the datagrams in the same stream to form ordered recording streams 161. It should be understood that the term timestamp encompasses any datagram fields, or combination of datagram fields, that may be used to order the datagrams in recording streams 160. For example, a sequence number field may be used alone, or in combination with another field, such as a time value field, to order the datagrams in recording streams 160.

At least part of ordered recording streams 161, or part of the datagrams in ordered recording streams 161, are each stored in datagram storage 110 and each associated with the sessions 111-113 to which they were allocated. In an embodiment, ordered recording streams 161 comprises an ordered plurality of complete datagrams. In another embodiment, ordered recording streams 161 comprises an ordered plurality of partial datagrams. For example, only the payload portion of the datagrams received via one of recording streams 160 may be sent to datagram storage 110. In another embodiment, not all of the datagrams in an ordered recording stream are stored. Instead, only datagrams of interest, such as a particular time period, are stored.

The datagrams in recording streams 160 are ordered based upon a timestamp in each datagram. In an embodiment, the ordering may also be based upon other datagram fields. For example, RTP datagrams may be ordered based upon two fields in the RTP datagram header: the sequence number and timestamp fields. Because the timestamp field may not be unique from datagram to datagram, the sequence number may also be used to order the datagrams received via recording streams 160.

While ordering the datagrams in recording streams 160, datagram sequencing and checking 108 checks for criteria that indicate an error condition. In an embodiment, a criterion indicating an error condition may include detecting when more than a threshold number of datagrams with timestamps within a set time period has been received. For example, if a recording session is expected to have a data rate of 50 Datagrams-Per-Second (DPS), then receiving 100 or more datagrams having timestamps within one second of each other may indicate an error condition.

In another embodiment, a criterion indicating an error condition may include detecting when a datagram is received out of order by a threshold number of datagrams. For example, if a recording session is sequencing datagrams with sequence numbers in the neighborhood of N, then receiving a datagram with a sequence number M that meets the formula |N-M|>1024 may indicate an error condition.

In another embodiment, a criterion indicating an error condition may include detecting when more than a threshold number of duplicate datagrams out of a set number of datagrams has been received. For example, receiving more than Z number of datagrams with at least one other duplicate out of P datagrams may indicate an error conditions. To be a duplicate, the datagrams do not need to be exact copies. For example, having two datagrams with the same value in a field that is supposed to be unique, such as a sequence number, or timestamp, may be all that is necessary for two datagrams to qualify as duplicates. Other fields may differ between the two datagrams and still have them qualify as duplicates.

Because the aforementioned error condition criteria only trigger in exceptional cases, these checks have very little impact on the processing of the many thousands of datagrams be received and sequenced. In addition, since many datagrams will be received in sequence, the process of sequencing and checking datagrams for these error conditions consumes a relatively small amount of compute resources. Hence, it is efficient to assume that other fields in the datagrams do not indicate a problem as long as the sequence numbers and timestamps are changing from datagram to datagram in an expected manner.

It is only when there is an anomaly that other datagram fields need to be checked to detect a problem. In addition to detecting a problem, the other fields may be checked to identify specific characteristics of the datagrams that indicate an error condition.

For example, it may be determined that the datagrams that triggered an error condition on multiple recording streams all came from the same IP source address. This characteristic may indicate a Denial of Service (DoS) attack. Knowledge of this characteristic may be used to enable an appropriate test within the network layer that will identify and eliminate the troublesome datagrams.

Datagrams are allocated to a particular recording stream by datagram allocation 106 and sent to through datagram sequencing and checking 108 without further processing by the transport or application layers. This saves machine cycles or other resources on recording computer 140. These machine cycles and resources are saved by not subjecting the datagrams sent to datagram allocation 106 to all of the examination normally undertaken by a full network layer. Specifically, the assumption that all IP datagrams received will be for a single IP address and/or that only UDP datagrams will be received allow the elimination of at least tests on the IP address and IP protocol type fields respectively. Similarly, in addition to the tests done by datagram sequencing and checking 108, recording computer 140 may be configured to rely upon the checksum of the data link layer to ensure the integrity of a transmission. This avoids testing the various checksums within the IP elements of the message. Testing for a valid RTP header may also be skipped as well as confirming that the datagram length is consistent with the IP length indication.

Datagram storage 110 is a storage medium such as a high capacity digital data storage device such as a CD-ROM, magnetic hard drive, DVD drive, DAT cassette, flash memory, or some combination of similar devices. Datagram storage 110 may also store other information associated with the stored datagrams, or sessions 111-113, such as the association between stored datagrams and sessions 111-113 so that the computer communications recorded by recording computer 140 may be reconstructed, replayed, displayed, etc.

Figure 2:
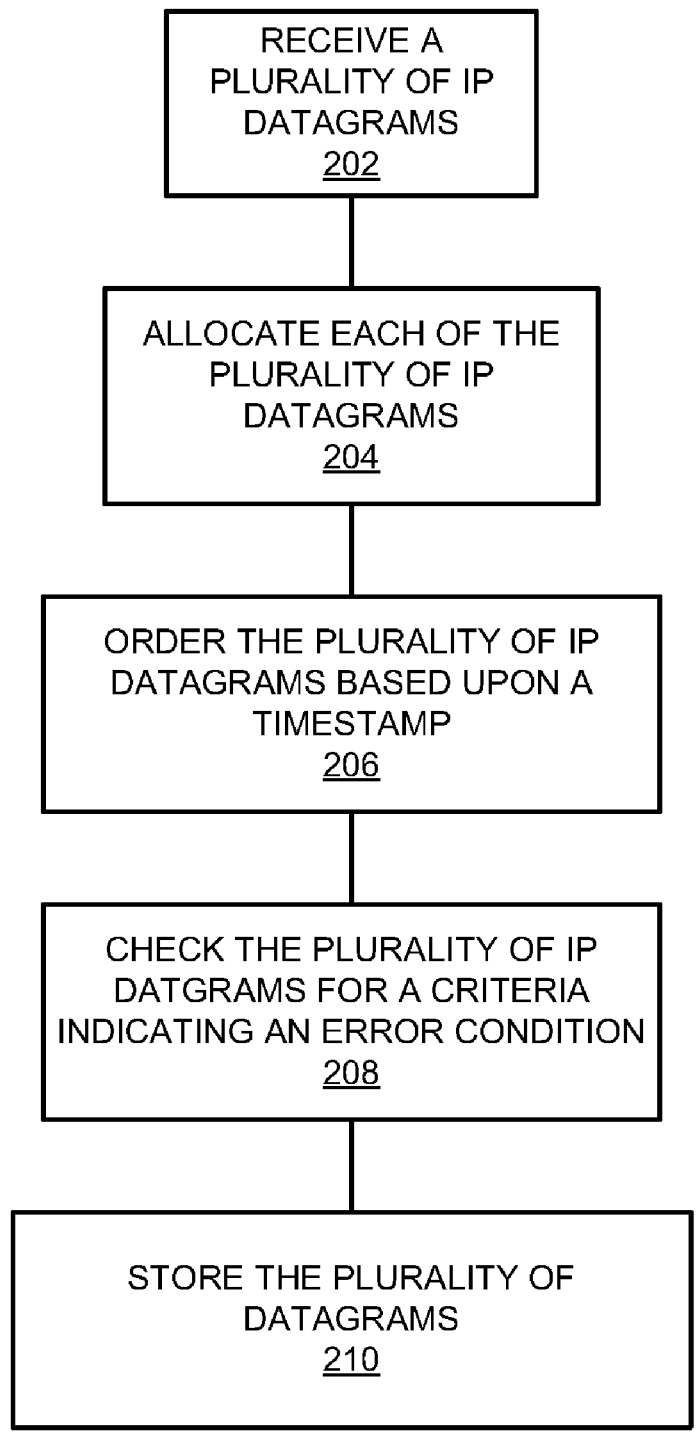
FIG. 2 is a flowchart illustrating a method for recording computer communication sessions.

FIG. 2 is a flowchart illustrating a method for recording computer communication sessions. The steps of FIG. 2 may be performed by one or more elements of communication recording system 100. A plurality of IP datagrams are received (202). For example, a plurality of IP datagrams may be received by a recording network interface such as network interface 102. Each of the plurality of IP datagrams are allocated to a recording stream (204). In an embodiment, each received datagram may be allocated by examining at least a first value at a fixed location, or offset, in the datagram. Datagrams may also be allocated based on other values at other fixed locations, or offsets, in each datagram.

In an embodiment, if the datagram is formatted as a UDP datagram, then the value at the fixed location may be, for example, the destination port number of the datagram. In an embodiment, the datagram may be allocated based upon the destination port number of the datagram.

In another embodiment, datagrams may be allocated based upon a plurality of values at fixed locations in the datagram. For example, a combination of two fields and possibly four may be the basis for allocating a datagram. As an example, consider the case of a conference bridge sending from a single IP address and port to many participants in a conference. In this case, the IP source address, source port number, IP destination address, and destination port number, which are all at fixed offsets within a datagram, may be used to allocate datagrams.

The plurality of IP datagrams are ordered based upon a timestamp within each datagram (206). It should also be understood that the term timestamp encompasses any datagram fields, or combination of datagram fields, that may be used to order the datagrams in recording streams 160. For example, the ordering may also be based upon other datagram fields. In particular, RTP datagrams may be ordered based upon two fields in the RTP datagram header: the sequence number and timestamp fields. Because the timestamp field may not be unique from datagram to datagram, the sequence number may also be used to order the plurality of IP datagrams.

The plurality of IP datagrams are checked for a criterion that indicates an error condition (208). The plurality of IP datagrams may be checked while they are being ordered in step 206. In other embodiments, the plurality of IP datagrams may be checked before or after ordering in step 206.

In an embodiment, a criterion that indicates an error condition may include detecting when more than a threshold number of the plurality of IP datagrams with timestamps within a set time period has been received. For example, if a recording session is expected to have a data rate of 50 RTP Datagrams-Per-Second, then receiving 100 or more RTP datagrams having timestamps within one second of each other may indicate an error condition.

In another embodiment, a criterion that indicates an error condition may include detecting when an IP datagram is received out of order by a threshold number of datagrams. For example, if a recording session is sequencing RTP datagrams with sequence numbers in the neighborhood of N, then receiving an RTP datagram with a sequence number M that meets the formula $|N-M|>1024$ may indicate an error condition.

In another embodiment, a criterion that indicates an error condition may include detecting when more than a threshold number of duplicate IP datagrams out of a set number of datagrams has been received. For example, receiving more than Z number of RTP datagrams with at least one other duplicate out of P RTP datagrams may indicate an error condition. To be a duplicate, the RTP datagrams do not need to be exact copies. For example, having two RTP datagrams with the same value in a field that is supposed to be unique, such as a sequence number, or timestamp, may be all that is necessary for two RTP datagrams to qualify as duplicates. Other fields may differ between the two RTP datagrams and still have them qualify as duplicates.

The plurality of IP datagrams are stored (210). In an embodiment, the plurality of IP datagrams may be allocated by using a very simple method (e.g. based upon a value at a fixed location in the datagram), ordered, checked, and then stored without further processing by the transport or application layers thus saving machine cycles or other resources on the recording computer implementing the method.

In an embodiment, the plurality of IP datagrams is stored associated with other IP datagrams that were allocated in the same or similar manner. For example, all IP datagrams that were allocated based upon a certain destination port number may be associated with each other.

In another example, all of the plurality of IP datagrams that arrive between specific events and were allocated based upon a certain destination port number may be associated. For example, all of the plurality of IP datagrams received between the "off hook" and "on hook" signals of VoIP calls from 210-555-3210 and with a destination port number of 2300 would be associated with each other. Other examples and associations are possible for categorizing, reconstructing, replaying, displaying, etc. the plurality of IP datagrams stored in step 210.

Figure 3:
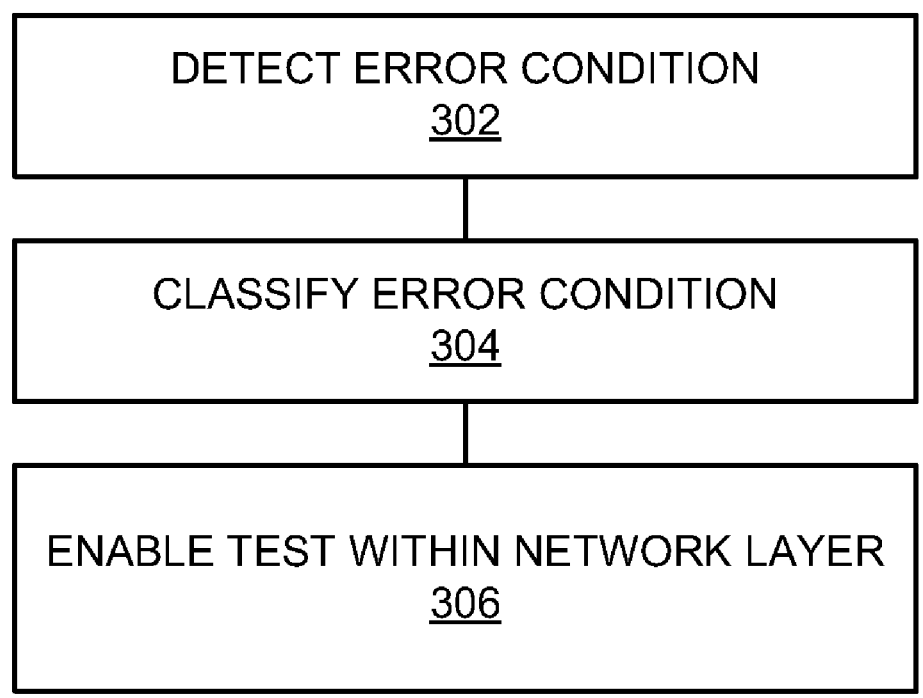
FIG. 3 is flowchart illustrating a method for enabling selected datagram tests.

FIG. 3 is flowchart illustrating a method for enabling selected datagram tests. The method of FIG. 3 may be performed by one or more elements of communication recording system 100. An error condition is detected (302). For example, the error condition may be detected by datagram sequencing and checking 108.

The error condition is classified (304). For example, various fields of the datagrams in recording streams 160 may be checked to identify specific characteristics of the datagrams that indicate an error condition. In an embodiment, it may be determined that the datagrams that triggered an error condition on multiple recording streams all came from the same IP source address. This characteristic may indicate a Denial of Service (DoS) attack.

In another example, the source IP address of the troublesome datagrams may not match the source IP of a computer 131 authorized to direct communications to be recorded to recording computer 140 via network 120. This characteristic may indicate a web robot is attempting to access recording computer 140 and that this web robot should be blocked.

Knowledge of the characteristics of the datagrams that triggered the error condition may be used to enable an appropriate test within the network layer that will identify and eliminate the troublesome datagrams (306). For example, network subset layer 104 may be configured to prevent datagrams from certain protocols, ports or IP addresses from being passed on to datagram allocation 106.

Figure 4:
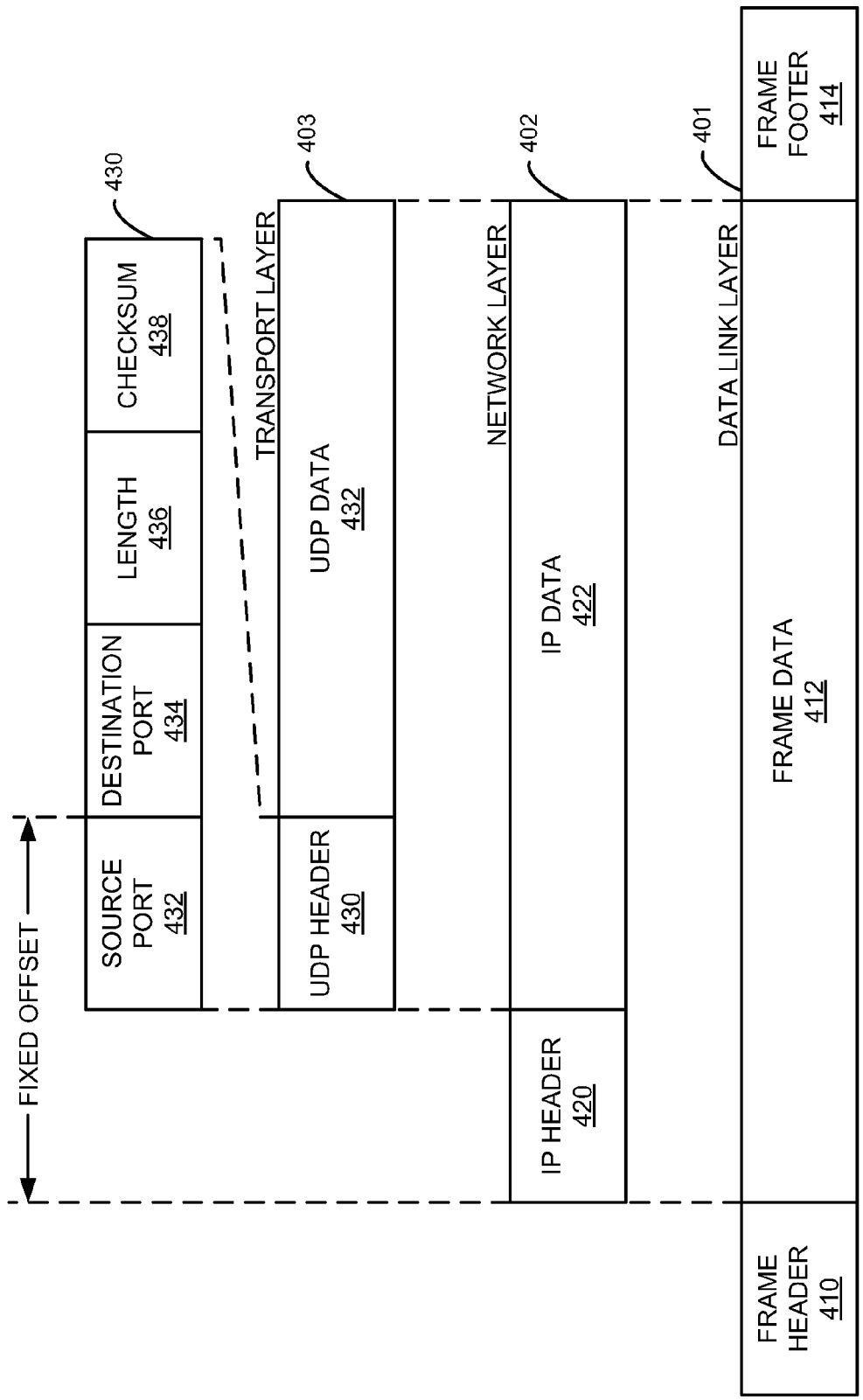
FIG. 4 is an illustration of a value at a fixed position within a datagram that may be used to allocate datagrams.

FIG. 4 is an illustration of a value at fixed position within a datagram that may be used to allocate datagrams. The value at the fixed position may be used as a session identifier. A data link layer datagram 401 includes frame header 410, frame data 412, and frame footer 414. Frame data 412 may be formatted as network layer datagram 402. Network layer datagram 402 may be comprised of fixed length IP header 420 and IP data 422. IP data 422 may be formatted as transport layer datagram 403. Transport layer datagram 403 may be formatted as fixed length UDP header 430 and UDP data 432. UDP header 430 may be further divided into source port field 432, destination port field 434, length field 436, and checksum field 438. Each of these fields may be of a fixed length.

In this example, since IP header 420, UDP header 430, and source port field 432 are all of a fixed length, UDP destination port field 434 may be read directly from any of frame data 412, IP datagram, or UDP datagram by examining the data that is at a fixed location, or fixed offset, in frame data 412, IP datagram, or UDP datagram, respectively. In other words, if it is assumed that the only type of datagram that is being processed is a UDP datagram, the UDP destination port number can be read directly from an IP datagram by examining a fixed location in the IP datagram without further processing. This UDP destination port number can then be used as a session identifier to allocate the datagram to a session. Accordingly, this allocation may be accomplished directly from an IP datagram without the additional processing that is typically done by the network and transport layers prior to extracting the UDP destination port.

In the above discussion, the systems and methods make certain assumptions. These assumptions include that the datagrams received are correctly addressed, internally consistent and of the expected protocol type. These assumptions are based on the knowledge that under normal conditions, only authorized computers direct traffic to network interface 102. Those authorized computers only direct traffic packets to network interface 102 that meet the above assumptions. Accordingly, when the systems and methods described above make these assumptions, they are appropriate assumptions to make.

In other words, the applications in the computers authorized to direct traffic to the recording network interface 102 ensure that the received packets are correctly addressed, internally consistent, and of the expected protocol type so that recording computer 100 does not have to make these checks. For example, computers authorized to direct traffic to the recording network interface 102 may only be authorized to send UDP In foregoing discussions, the term packet is used to describe messages and information at the Internet reference model physical layer. The term datagram is used to describe messages and information as it is being processed at the other Internet reference model layers. However, it should be understood that the term datagram encompasses the term packet and visa-versa.

The methods, systems, networks, layers, and computers described above may be implemented with, contain, or be executed by one or more computer systems. The methods described above may also be stored on a computer readable medium. Many of the elements of communication recording system 100 may be, comprise, or include computers systems. This includes, but is not limited to: Computer 130; computer 131; and, recording computer 140. These computer systems are illustrated, by way of example, in FIG. 5.

Figure 5:
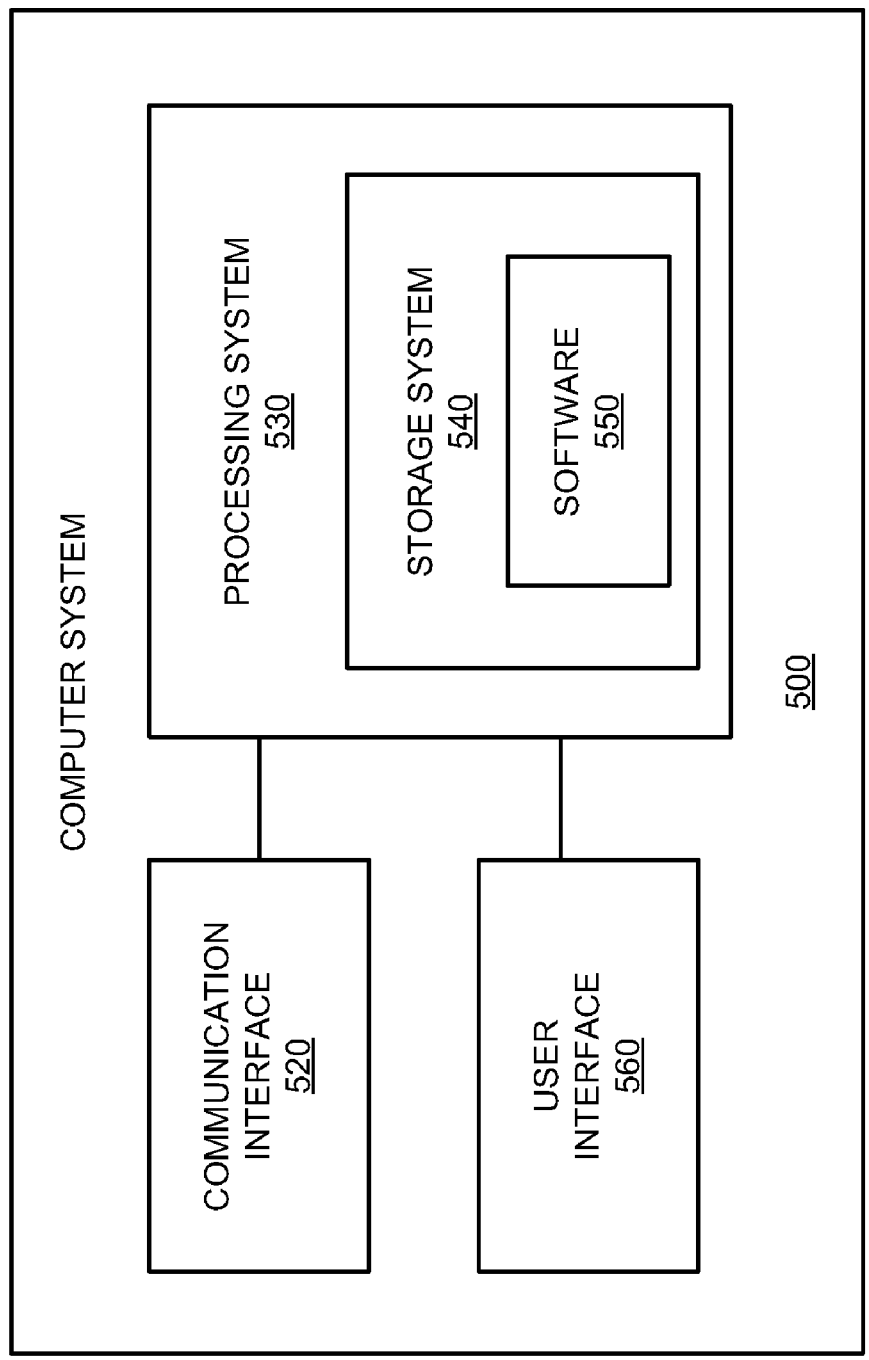
FIG. 5 is a block diagram illustrating a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above but only by the following claims and their equivalents.

What is claimed is:

1. A method of recording computer communications, comprising:
   receiving a first plurality of IP datagrams directed to a recording network interface;
   allocating the first plurality of IP datagrams to a first recording stream of datagrams based upon a first session identifier specified at a first offset in the plurality of IP datagrams;
   ordering the first plurality of IP datagrams into an ordered recording stream based upon a timestamp;
   while ordering the first plurality of IP datagrams, checking the first plurality of IP datagrams for criteria that indicate an error condition; and,
   storing at least a portion of the ordered recording stream associated with the first recording stream of datagrams.

2. The method of claim 1 wherein the error condition triggers more detailed datagram checking at the network layer.

3. The method of claim 1 wherein the criteria includes detecting more than a threshold number of datagrams having timestamps within a set time period.

4. The method of claim 3 wherein the error condition triggers more detailed datagram checking at the network layer.

5. The method of claim 1 wherein the criteria includes detecting a datagram that was received out of order by a threshold number of datagrams.

6. The method of claim 5 wherein the error condition triggers more detailed datagram checking at the network layer.

7. The method of claim 1 wherein the criteria includes detecting more than a threshold number of duplicate datagrams out of a set number of datagrams.

8. The method of claim 7 wherein the error condition triggers more detailed datagram checking at the network layer.

9. A system for recording computer communications, comprising:
- a network interface receiving a plurality of IP datagrams to be recorded;
- a datagram allocator that allocates the plurality of IP datagrams to a recording stream based upon a session identifier specified at a fixed offset in each of the plurality of IP datagrams;
- a re-sequencer that orders the plurality of IP datagrams based upon a timestamp into an ordered plurality of IP datagrams and checks the plurality of IP datagrams for criteria that indicate an error condition; and,
- datagram storage that stores at least a portion of the ordered plurality of IP datagrams.

10. The system of claim 9 wherein the error condition triggers more detailed datagram checking at the network layer.

11. The system of claim 9 wherein the criteria includes detecting more than a threshold number of datagrams having timestamps within a set time period.

12. The system of claim 11 wherein the error condition triggers more detailed datagram checking at the network layer.

13. The system of claim 9 wherein the criteria includes detecting a datagram that was received out of order by a threshold number of datagrams.

14. The system of claim 13 wherein the error condition triggers more detailed datagram checking at the network layer.

15. The system of claim 9 wherein the criteria includes detecting more than a threshold number of duplicate datagrams out of a set number of datagrams.

16. The system of claim 15 wherein the error condition triggers more detailed datagram checking at the network layer.

17. A computer readable medium having instructions stored thereon for recording computer communications that, when executed by a computer, at least direct the computer to:
- receive a first plurality of IP datagrams directed to a recording network interface;
- allocate the first plurality of IP datagrams to a first recording stream of datagrams based upon a first session identifier specified at a first offset in the plurality of IP datagrams;
- order the first plurality of IP datagrams into an ordered recording stream based upon a timestamp;
- while ordering the first plurality of IP datagrams, checking the first plurality of IP datagrams for criteria that indicate an error condition; and,
- storing at least a portion of the ordered recording stream associated with the first recording stream of datagrams.

18. The computer readable medium of claim 17 wherein the error condition triggers more detailed datagram checking at the network layer.

19. The computer readable medium of claim 17 wherein the criteria includes detecting more than a threshold number of datagrams having timestamps within a set time period.

20. The computer readable medium of claim 19 wherein the error condition triggers more detailed datagram checking at the network layer.

21. The computer readable medium of claim 17 wherein the criteria includes detecting a datagram that was received out of order by a threshold number of datagrams.

22. The computer readable medium of claim 21 wherein the error condition triggers more detailed datagram checking at the network layer.

23. The computer readable medium of claim 17 wherein the criteria includes detecting more than a threshold number of duplicate datagrams out of a set number of datagrams.

24. The computer readable medium of claim 23 wherein the error condition triggers more detailed datagram checking at the network layer.

* * * * *